United States Patent [19]
Neftel et al.

[11] Patent Number: 5,718,568
[45] Date of Patent: Feb. 17, 1998

[54] DRIVE SHAFT FOR A PERISTALTIC PUMP

[75] Inventors: Frédéric Neftel, Paris; Bernard Bouvier, Eragny sur Oise, both of France

[73] Assignee: Debiotech S.A., Lausanne 9, Switzerland

[21] Appl. No.: 584,427

[22] Filed: Jan. 11, 1996

Related U.S. Application Data

[63] Continuation-in-part of Ser. No. 157,023, filed as PCT/FR93/00396, Apr. 22, 1993, abandoned.

[30] Foreign Application Priority Data

Apr. 24, 1992 [FR] France ............... 92 05114

[51] Int. Cl.$^6$ .................. F04B 43/00; F16H 13/06
[52] U.S. Cl. .................. 417/476; 475/183; 476/72
[58] Field of Search .................. 417/476, 477.1, 417/477.3, 477.6, 53; 79/45, 60, 492, 39; 475/183; 476/72

[56] References Cited

U.S. PATENT DOCUMENTS

| | | | |
|---|---|---|---|
| 920,946 | 5/1909 | Fries | 475/183 |
| 2,899,904 | 8/1959 | Becher | 417/477.6 |
| 2,899,905 | 8/1959 | Becher | 417/477.6 |
| 2,899,906 | 8/1959 | Becher | 417/477.6 |
| 2,899,907 | 8/1959 | Becher | 417/477.6 |
| 3,249,059 | 5/1966 | Renn | 417/477.6 |
| 4,976,590 | 12/1990 | Baldwin | 417/53 |
| 5,037,274 | 8/1991 | Holmes et al. | 417/53 |
| 5,249,938 | 10/1993 | Hall | 417/477 |
| 5,360,432 | 11/1994 | Shturman | 606/159 |

*Primary Examiner*—Timothy Thorpe
*Assistant Examiner*—Peter G. Kortynyk
*Attorney, Agent, or Firm*—Nikaido, Marmelstein, Murray & Oram LLP

[57] ABSTRACT

A drive shaft for at least a rotating roller wherein the external portion of said drive shaft has surfaces treated by projection of particles to impart to it a controlled roughness designed to enable slip-free non-gear-like tooth drive of the roller by the shaft.

10 Claims, 5 Drawing Sheets

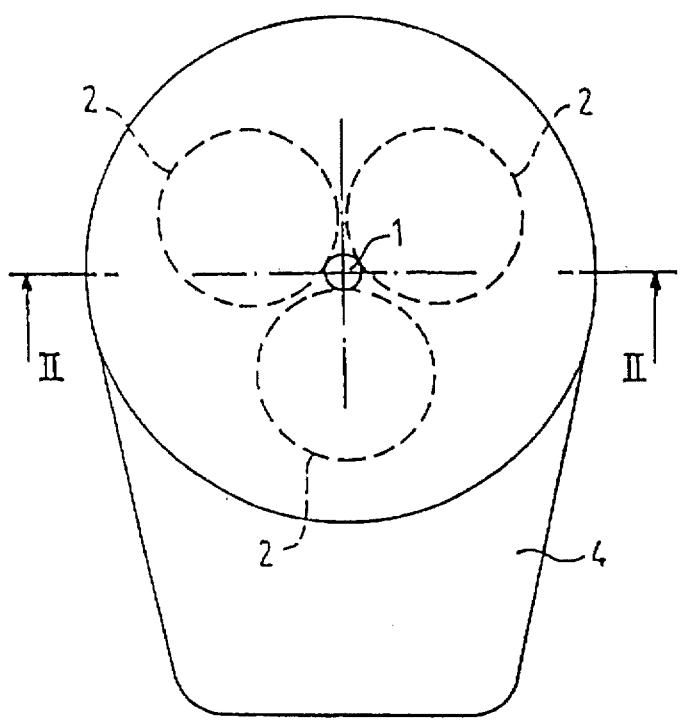
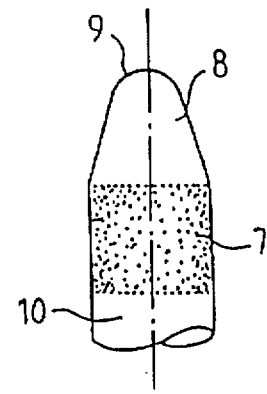
FIG. 1
FIG. 2A
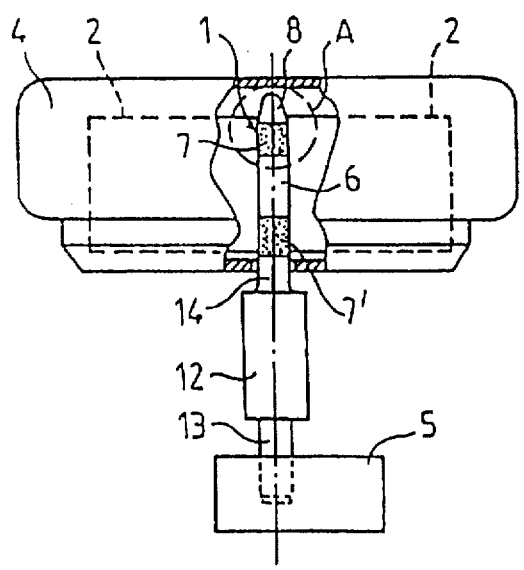
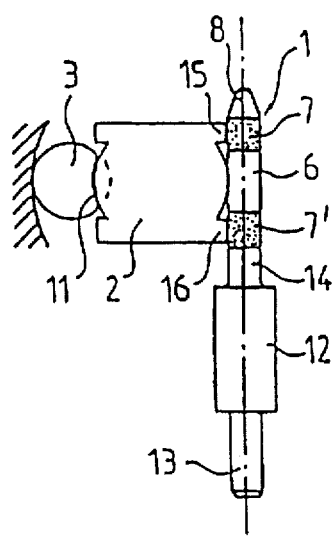
FIG. 2
FIG. 3

DRIVE SHAFT FOR A PERISTALTIC PUMP

This application is a continuation-in-part application of application Ser. No. 08/157,023, filed May 4, 1994, now abandoned which in turn is a national stage application of PCT/FR93/00396 filed Apr. 22, 1993.

FIELD OF THE INVENTION

The present invention concerns a drive shaft for a peristaltic pump and its process of manufacture.

BACKGROUND OF THE ART

In peristaltic pumps, drive shafts are used to rotate rollers, which compress deformable tubes containing the liquid to be conveyed.

These shafts are connected by all suitable linkages to a driving motor. The driving motor rotates the drive shaft, which acts on at least one roller which is contiguous to it.

Usually, drive shafts are metallic, and are specifically made of stainless steel, whereas the rollers are made of various plastics.

The drive shafts in the prior art are generally satisfactory. However, it has been found that, after a certain period of use, wear occurs, both of the drive shaft and of the roller, accompanied by slippage between the shaft and the roller, which leads to faulty rotation and to unsatisfactory drive.

The faulty drive of a roller by a shaft prevents the uniform and appropriate compression of the deformable tube, with which a roller comes into contact, and, consequently, prevents proper conveyance of the liquid to be transported.

Many attempts were made in the past to try to avoid this slippage, but, to the best of the applicant knowledge, they have all proved fruitless because, in fact, it has been necessary to compress the rollers to obtain a satisfactory drive.

U.S. Pat. Nos. 2,899,904, 2,899,905, 2,899,906 and 2,899,907 describe roller pumps by the same inventor, wherein the drive shafts have a generally cylindrical form with an intermediate portion of driving contact with the cylindrical surface of at least one roller element.

The intermediate portions of said shafts are respectively roughened, as by knurling ('904), formed with a series of serrations extending parallel to the axis of the drive shaft ('905, '906), or include a slotted driving surface ('907). The at least one roller is of nylon or other suitable plastic material and, therefore, has a tendency to expand when the pump operates and the various parts thereof become heated to some extent.

With either arrangement, the roller(s), when originally installed, may be smooth surfaced as the initial operation of the pump permits the shaft to knurl or slot the roller(s) and form an intimately mated driving engagement therebetween, this surface roughening will develop further during usage, since the rollers expand and, thereby, impose a high compression on the drive shaft.

However, the surfaces of the drive shafts known from the four documents cited above are liable to cause rapid wear of the rollers, as comparative tests have shown. Additionally, the roughness is unstable in time.

U.S. Pat. No. 3,249,059 describes a peristaltic-type pump comprising a planetary roller assembly with a central drive roller and four planetary rollers. The central roller is non-rotatably mounted on a drive shaft and provided with a pair of friction rings in order to minimize slippage between the central roller and the planetary rollers. The rings are preferably made of a resilient material and may be standard O-rings.

However, the friction rings are a potential source of failure and, furthermore, they fail to correct all the drive defects. Finally, they are rapidly worn.

U.S. Pat. No. 5,037,274 describes a peristaltic apparatus comprising a generally cylindrical drive shaft having a pointed or convergent end, and a plurality of rings designed to revolve and rotate in orbital manner about the drive shaft.

SUMMARY OF THE INVENTION

The present invention corrects the aforementioned drawbacks, and proposes a drive shaft for rotating rollers, with which slip-free non-gear-like tooth drive of a roller by the shaft is obtained.

In the present invention, the drive is obtained without compressing the rollers and with a very low drive torque.

The present invention also includes a process of manufacture of such a shaft.

The present invention thus creates a drive shaft for at least one rotating roller, wherein the external part of said drive shaft has surfaces treated by the projection of particles, to impart a controlled roughness to it, designed to enable slip-free drive of the roller by the shaft.

The present invention also includes a process of manufacture of a drive shaft of a peristaltic pump with rotating rollers, from a cylindrical metal shaft, in which the zone intended to come into contact with a rotating roller is cropped, and then ground, to obtain a controlled uniform surface state, wherein a portion at least of said zone designed to come into contact with a roller is surface-treated by the projection of a material to impart a controlled roughness to it.

The present invention also concerns the following characteristics, considered separately or in all technically possible combinations:

- the treated surfaces are provided over the entire external portion of the drive shaft,
- the treated surfaces are made selectively on one or more zones of the drive shaft,
- only the external parts of the drive shaft, intended to come into contact with at least one roller, are treated,
- the surface treatment is made by the projection of solid particles,
- the surface treatment is a shot-blasting, in which glass beads, particles of tungsten, sand, or similar, are projected against the external surface of the drive shaft,
- the upper portion of the shaft has a rounded tapered shape, the radius of curvature of the cone of the shaft is approximately equal to half the diameter of the shaft at the level of the rollers,
- the treated parts designed to come into contact with the rollers correspond to the upper part and to the lower part of a roller, which causes the squeezing of the tube by its median portion,
- the treated part of the drive shaft is subsequently polished.

The surface treatment by projection of a material allows to obtain surfaces free of sharp edges or gear-like teeth and having roughness values $R_a$ of down to the order of $10^{-1}$ micrometers, and being, at the same time, shaped such that they still allow to obtain a good drive without slipping of the rollers on the drive shaft. Further, this type of surface treatment allows to vary the roughness over a relatively wide range by simple variation of the projected material and of the projection characteristics.

Besides this, the smooth surfaces as treated according to the invention avoid nearly all wear of the rollers, and, thereby, also avoid all roller-material deposit on the shaft which could be liable to diminish the drive characteristics of the shaft.

Table I shows the characteristics of four drive shafts for a peristaltic pump obtained with different known methods of surface treatment as compared to the characteristics of a shot-blasted drive shaft according to the present invention.

The prior-art treated drive shafts are as follows:

- a finish-ground shaft where finish-grinding was used for obtaining a precisely dimensioned shaft;
- a ceramic-covered shaft which had been obtained by projection of ceramic material and subsequent finish-grinding;
- a duplicate molded shaft which had been obtained by molding a polyurethane resin onto selective sections of a steel shaft which correspond to the positions of the rollers;
- a knurled shaft which had been obtained by knurling a steel shaft with knurling tools as usually used for knurling handles, nuts and the like for better wieldiness thereof.

All disadvantages of the prior-art treated drive shafts are compensated for by the invention and replaced by opposite, i.e., advantageous, characteristics of the drive shaft of the present invention. Especially, the sections of the drive shafts of the invention intended to be in driving contact with at least one roller have surface shape which looks like volcanos with rounded summits. These rounded summits allow to give to the drive shaft section(s) a sufficient roughness for driving the roller(s) without causing noticeable wear of the roller(s), since the summits are not sharp.

BRIEF DESCRIPTION OF THE DRAWINGS

The above and other objects and advantages of the invention will be apparent from the following description taken in conjunction with the accompanying drawing wherein:

FIG. 1 is a plan view of a portion of a peristaltic pump,

FIG. 2 is a cross-section along line II—II of FIG. 1,

FIG. 2A is detail A of FIG. 2,

FIG. 3 is a partial schematic section of a shaft and a rotating roller,

DETAILED DESCRIPTION OF PREFERRED EMBODIMENT

Figure 4:
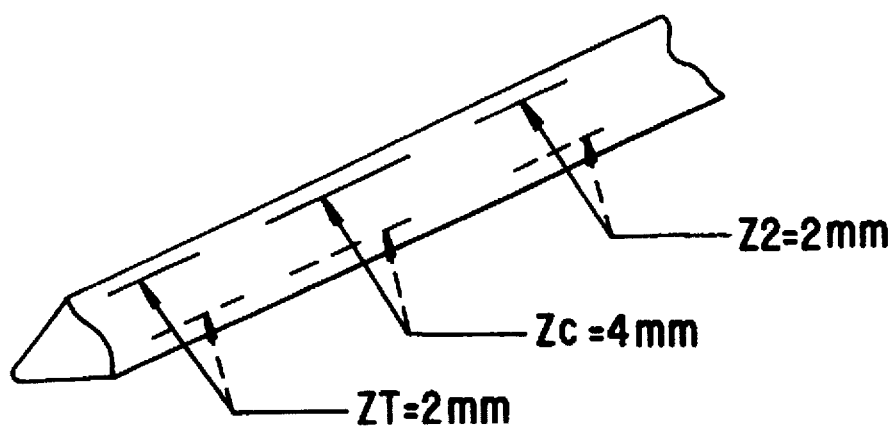
FIG. 4 is a partial perspective view of a shaft showing where roughness measurements were taken.
Figure 5:
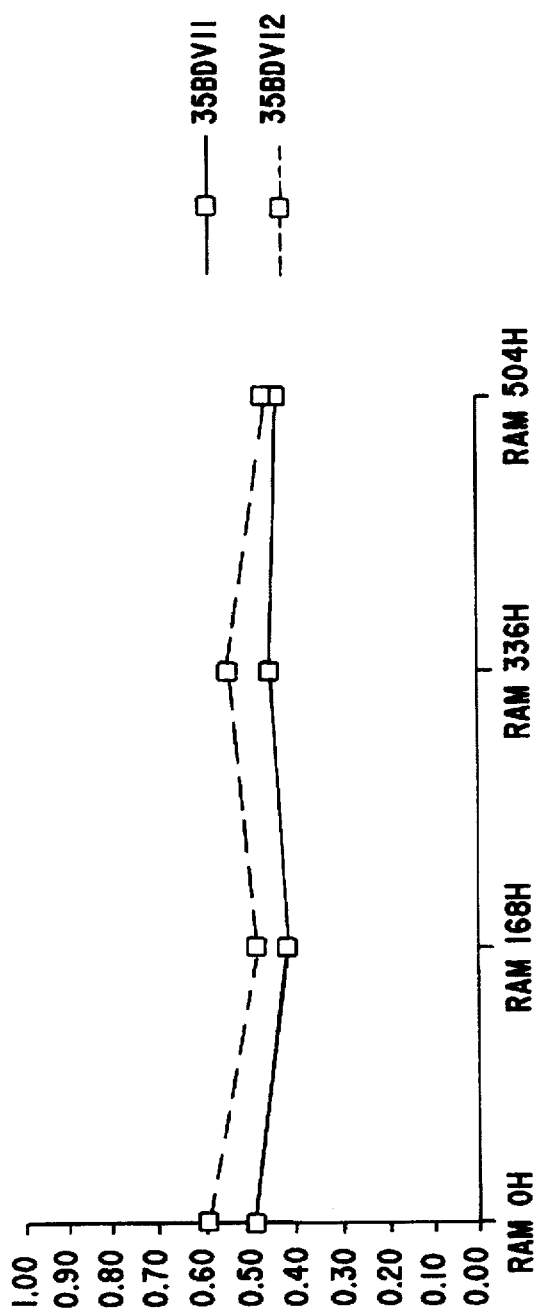
FIGS. 5, 6, 7, and 8 are graphic representations of the average roughness values $R_{am}$ of Table III.
Figure 6:
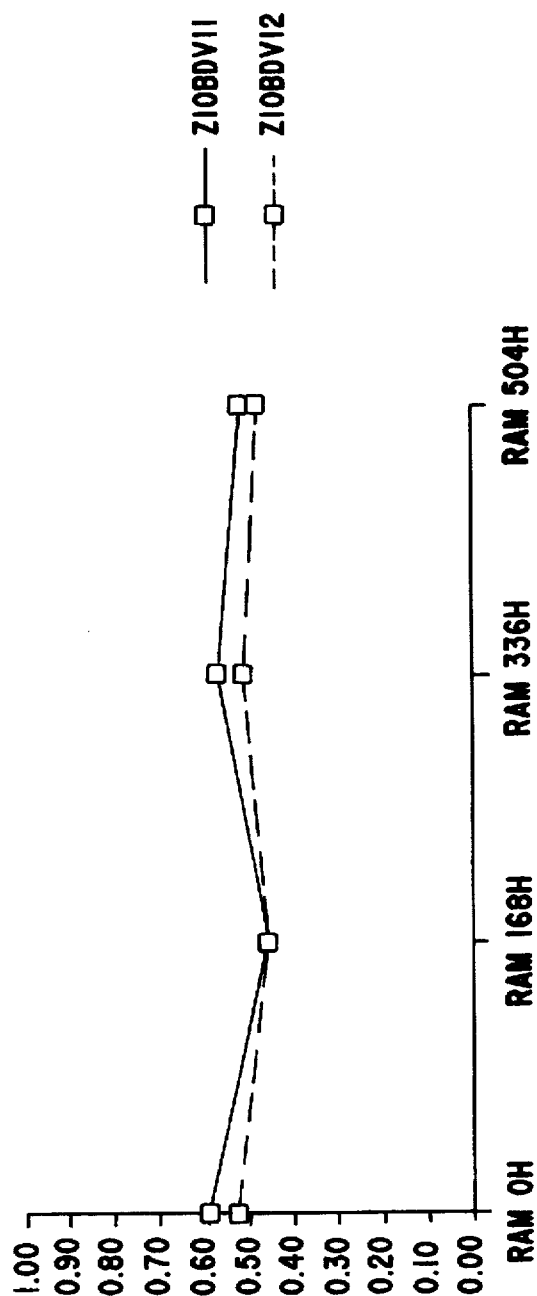
Figure 7:
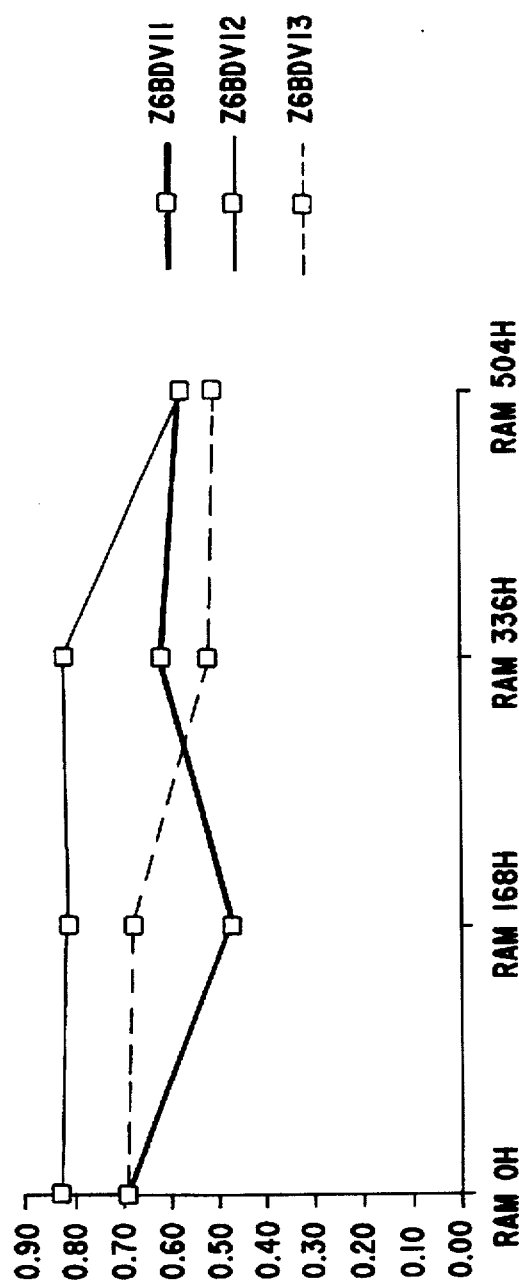
Figure 8:
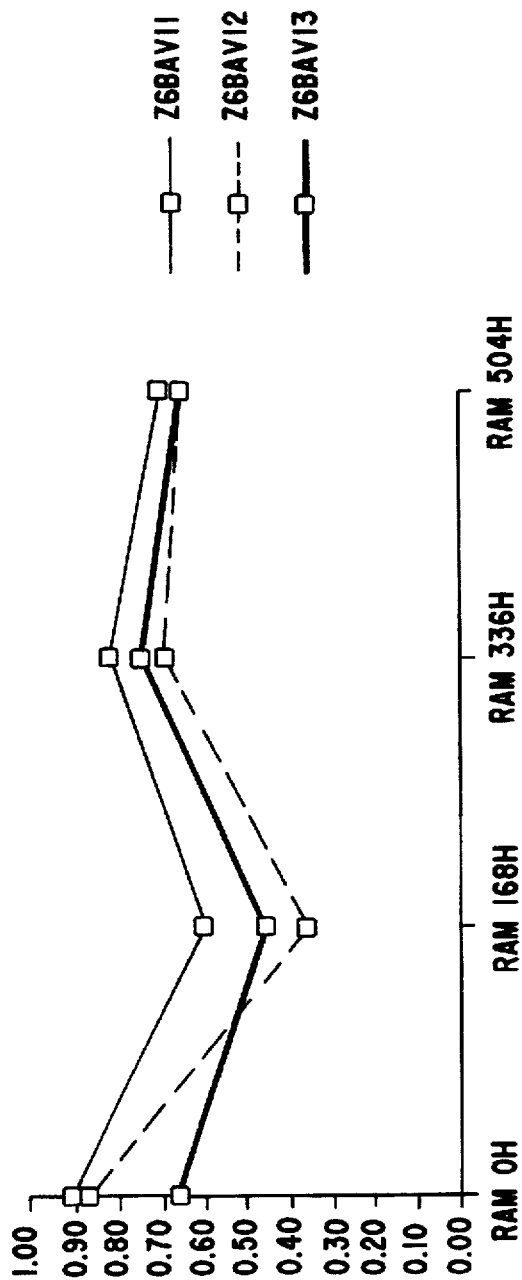
Figure 9:
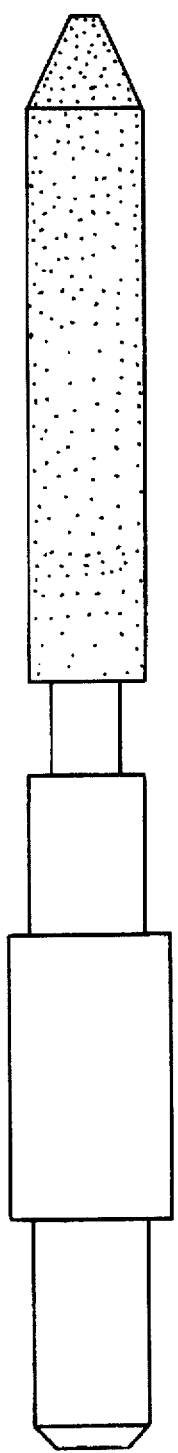
FIG. 9 shows a representation of the surface of the roughened section together with the formula for calculating the roughness Ra.
Figure 9A:
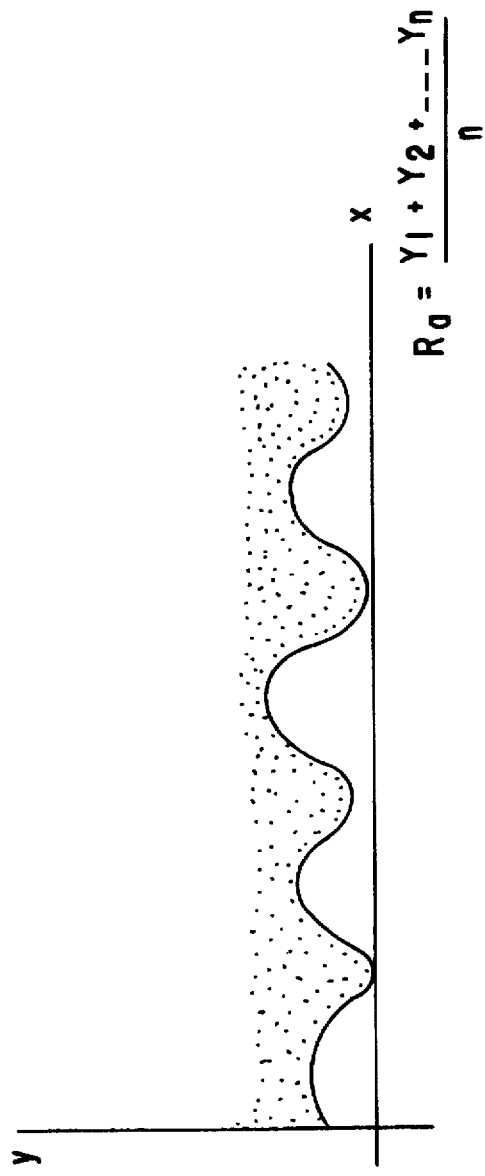

FIG. 1 illustrates schematically and partially a peristaltic pump 4, with which three rollers 2 are rotated by a drive shaft 1 actuated by a motor, not shown.

With reference to FIG. 2, the drive shaft 1 has many different zones on its external surface coming into contact with at least one roller 2 housed in the peristaltic pump 4.

The drive shaft 1 is integral with a shoulder 12 which ensures its maintenance in the body of the peristaltic pump.

The driving motor 5 of the drive shaft 1 is connected to said shaft by a link 13, which may be of any appropriate shape.

The external surface 6 of the drive shaft 1, coming into contact with at least one roller 2, comprises treated surfaces 7,7' cooperating with selective portions of the roller 2.

The method of obtaining the treated surfaces 7,7' is described below.

FIG. 2A shows detail A of the upper end of the drive shaft 1.

The upper portion 8 of the drive shaft 1 has a rounded tapered shape.

The radius of curvature 9 of the tip of the cone is approximately equal to half the radius 10 of the drive shaft 1 at the level of the rollers 2.

FIG. 3 shows the cooperation between an example of a drive shaft 1 according to the present invention, and a particular example of a roller having a bulge configuration.

In the implementation of the invention according to FIG. 3, only zones 7,7' coming into contact with the portions 15,16 of the roller 2 are treated, while the other external portion 6 of the drive shaft 1 are not treated. Alternatively the entire external surface 6 of the drive shaft 1 can be treated.

During the rotation of the roller 2 by the drive shaft 1, the tube 3 is compressed by the median portion 11 of the rotating roller 2.

For better understanding of the nature and shape of the surface of drive shafts in accordance with the present invention, the following description of the treatment of the external surface of the drive shaft 1 will now be made.

The surface treatment of the drive shaft 1 of the rollers 2 is what is commonly referred to as shot-blasting or abrasive blasting.

According to this shot-blasting or abrasive blasting treatment, particles are projected, generally solid particles, at a certain angle and under a predetermined pressure, to obtain a controlled roughness of the selective portions of the drive shaft which have received the projections of solid particles.

These projections of solid particles may, for example, be projections of glass beads, tungsten particles, or particles of various hard materials such as diamond. Naturally, they may also be projections of various sand particles.

BRIEF DESCRIPTION OF AN EMBODIMENT OF THE INVENTION

In an embodiment of the present invention, the drive shaft is manufactured in the following conditions.

The shaft is made in a material that is, for example, stainless steel.

It is ground in order to give it a precise diameter, for example 2.48+0.001 min.

It is then shot-blasted on at least one of selective portions 7,7'. For this purpose, the shaft is held by a rotary head and is subjected to the projecting ions of an adjustable nozzle, approximately perpendicular to the shaft, and actuated with a reciprocating movement parallel to the shaft. The nozzle thus sweeps the selective portions 7,7' of the shaft to be shotblasted.

The abrasive shot consists of glass beads or diamond crystals with an average size of 65 micrometers (gm).

The projection time was 5 s, at a distance of 100 mm, at a 90 degree shot angle.

The pressure of the machine projecting the abrasive was 2 bars.

In certain cases, after selective shot-blasting treatment over an extended zone, to obtain the portion 7,7' shown in the drawing, the drive shaft 1 was ground again in the portions 14 which did not receive the shotblasting or abrasive blasting treatment.

The shaft is then subjected to heat treatment accompanied by a deposition of titanium nitride, in a thickness of 2 micrometers (gm), for example. This treatment serves to enhance the superficial hardness of the shaft without changing its surface state.

During the intensive use of the drive shaft 1 according to the present invention, having treated selective portions 7,7' to have a controlled roughness during contact with the upper part 15 and lower part 16 of the rotating roller 2, it was found that the shot-blasting or abrasive blasting treatment, applied to the drive shaft 1 of the present invention, ensures a proper drive of the roller or rollers 2, without wear or abrasion of said roller or rollers 2. Nor is there any transfer of plastic particles to the shaft, which could lead to clogging of the craters created by the, shot-blasting or abrasive blasting.

The drive shaft 1 of stainless steel with the treated portions 7,7' as indicated above had a diameter of about 2.5 mm, while the diameter of the rotating rollers 2 was about 12 mm.

The portion of the drive shaft is polished entirely before abrasive blasting and, after the abrasive blasting operations, the dimensions of the drive shaft 1 are, unchanged, making it possible to obtain excellent dimensional accuracy of the diameter of the drive shaft 1.

A first test was conducted in order to compare a drive shaft of the present invention with prior-art shafts having the characteristics summarized in Table I. Before and after a 96 hour operation of the shafts, the following measurements were made and their results thereof compared with one another in Table II:

1. roughness of the selective sections of the shaft which are in frictional contact with the rollers of the pump;
2. drive shaft diameter;
3. corrosion stability in salty atmosphere,
4. friction coefficient by means of a blocked, i.e. non-rotating, roller and grease on the shaft surface; this measurement is important, since peristaltic pumps used for transfusions comprise torquemeters in order to detect any excessive slipping between the shaft and the rollers;
5. shape of the surface by visual inspection;
6. diameter accuracy; this characteristic is important, since it influences the compression of the roller(s) and thereby the torque transmitted to the rollers.

In a second test, four types of drive shafts according to the present invention, which had been shot-blasted with 45 μm corundum shot at a pressure of 3 bars, were tested. The first part of this test consisted in measuring the wear of the shafts over a period of 504 hours. During this period, measurements were regularly performed.

The four types of drive shafts tested were as follows:

| Steel Type (French standards) | Type of nitride deposition | Quantity of samples | Code used in the roughness table |
|---|---|---|---|
| 35CD4 | BALINIT D | 2 | 35BD |
| Z10 CNF 18-09 | BALINIT D | 2 | Z10 BD |
| Z6 CNU 15-05 | BALINIT D | 3 | Z6 BD |
| Z6 CNU 15-05 | BALINIT A | 3 | Z6 BA |

BALINIT D a chromium nitride coating and BALINIT A a chromium nitride coating are the names of respective processes from Balzers Company.

Roughness $R_a$ was measured at two opposite zones of the drive shaft external surface as shown in FIG. 4 as follows: at the two selective sections Z1 and Z2 which correspond to the roller positions as shown in FIG. 3 and at an intermediate section Zc situated approximately in the middle between sections Z1 and Z2. This additional measurement at Zc over a length of about 4 mm, which is the sum of the respective lengths of sections Z1 and Z2 (2 mm each), has been used for calculating the average roughness of the shafts before operation, i.e. at 0 hour, in order to compensate for irregular roughness around the shafts, after 168 hours, after 336 hours, and after 504 hours of operation at 600 rpm which corresponds to a transfusion flow rate of 100 ml per hour.

Table III shows for each of the samples and for each type of drive shaft the test results of roughness $R_a$ at the forementioned points in time (coded as 0H, 168H, 336H, and 504H) and at the different sections Zc, Z1, and Z2, and the corresponding calculated average roughness $R_{am}$.

FIGS. 5 to 8 are graphic representations of the average roughness values Ram of Table III.

Visual inspection with a binocular microscope did not reveal any noticeable wear. The average roughness of the four types of shafts diminished after 504 hours of operation as follows:

35 C-BALINIT D: 14.8%

Z10 CNF 18096-BALINIT D: 10.7%

Z6 CNU 1505-BALINIT D: 25.6%

25 CNU 1505-BALINIT A: 17.2%

The second part of this second test consisted in judging the corrosion stability of the four types of drive shafts. This was tested by means of three subsequent cycles of 48 hours each in salty atmosphere with intermediate 24-hour cycles at normal atmosphere:

| salty atmosphere: | 35° C. |
| | 5% ± 0.5% salt |
| | 1 bars |
| | 85% to 90% relative humidity |
| normal atmosphere: | 22° C. |
| | 85% to 90% relative humidity |

Only the 35 C-type drive shafts showed some traces of corrosion in the treated sections and heavy corrosion in the non treated sections. The samples of the other three types did not show any trace of corrosion. Therefore, it is clear that drive shafts of the invention have to be made of stainless steel.

Besides this, it was noticed that the BALINIT-A-treated shafts were liable to minor deterioration of the surface of the selected sections, whereas the BALINIT-D-treated shafts were free of such effects.

Therefore, as a conclusion of this second test, it is stated that drive shafts according to the present invention are preferably made of stainless steel and surface treated according to the BALINIT-D process in selective sections intended to be in frictional contact with rollers to be driven, and are shot-blasted with 45 μm-corundum shot at 3 bars pressure.

What is claimed is:

1. A drive shaft for at least one rotating roller, wherein an external part of said drive shaft has at least one section intended to be in frictional non-gear-like tooth contact with the at least one rotating roller, the surface of said at least one section having a granular sharp-edge-free shape and having an average roughness in the order of 0.4 to 0.6 micrometers.

2. The drive shaft according to claim 1, wherein the at least one section has been treated by the projection of surface roughening particles.

3. The drive shaft according to claim 1, wherein the at least one of said sections are first shot blasted and subsequently deposited with a layer of titanium nitride.

4. The drive shaft according to claim 1, wherein at least one of said sections is intended to be in contact with the at least one roller to correspond to an upper part and a lower part of an outer circumferential surface of a roller which causes the squeezing of a deformable tube by a medium portion of said circumferential surface.

5. The drive shaft according to claim 1, wherein the upper portion of the shaft has a rounded tapered shape.

6. The drive shaft according to claim 5, wherein the radius of curvature of the tip of the cone of the shaft is approximately equal to half the radius of the shaft at the level of the at least one roller.

7. The drive shaft according to claim 1, wherein the drive shaft is made of stainless steel.

8. The drive shaft according to claim 7, wherein the drive shaft is made of stainless steel of the Z10 CNF 18-09 type, having a composition comprising less than 0.12% C, less than 1% Si, less than 2% Mn, less than 0.04% P, less than 0.030% S, 17–19% Cr and 5.5–9% Ni.

9. The drive shaft according to claim 1 applied to a peristalic pump in which at least one roller compresses a deformable tube.

10. The drive shaft according to claim 1, wherein the at least one of said sections are first shot blasted and subsequently deposited with a layer of chromium nitride.

* * * * *